(12) United States Patent
Kawase et al.

(10) Patent No.: US 11,204,133 B2
(45) Date of Patent: Dec. 21, 2021

(54) GAS CONTROL DEVICE AND GAS CONTROL METHOD

(71) Applicant: HONDA MOTOR CO., LTD., Tokyo (JP)

(72) Inventors: Satoru Kawase, Wako (JP); Makoto Wada, Wako (JP); Kazuyuki Kadowaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/124,873

(22) Filed: Dec. 17, 2020

(65) Prior Publication Data
US 2021/0190267 A1 Jun. 24, 2021

(30) Foreign Application Priority Data

Dec. 18, 2019 (JP) .............................. JP2019-227862

(51) Int. Cl.
| | | |
|---|---|---|
| F17C 13/02 | (2006.01) | |
| G01K 15/00 | (2006.01) | |
| G01K 13/00 | (2021.01) | |
| G05D 7/06 | (2006.01) | |
| H01M 8/04082 | (2016.01) | |

(52) U.S. Cl.
CPC ............ *F17C 13/026* (2013.01); *G01K 13/00* (2013.01); *G01K 15/007* (2013.01); *G05D 7/0635* (2013.01); *H01M 8/04201* (2013.01); *F17C 2221/012* (2013.01); *F17C 2223/035* (2013.01); *F17C 2250/032* (2013.01); *F17C 2250/0439* (2013.01); *F17C 2250/0631* (2013.01); *F17C 2270/0178* (2013.01); *F17C 2270/0184* (2013.01); *H01M 2250/20* (2013.01)

(58) Field of Classification Search
CPC ............ F17C 13/026; F17C 2250/0631; F17C 2270/0184; F17C 2250/032; F17C 2270/0178; F17C 2221/012; F17C 2223/035; F17C 2250/0439; G01K 13/00; G01K 15/007; G05D 7/0635; H01M 8/04201; H01M 2250/20
USPC .......................................................... 141/1
See application file for complete search history.

(56) References Cited

U.S. PATENT DOCUMENTS

| | | | |
|---|---|---|---|
| 8,662,115 B2* | 3/2014 | Mori ................. | H01M 8/04089 141/94 |
| 2006/0280978 A1 | 12/2006 | Takaku et al. | |
| 2012/0216910 A1* | 8/2012 | Inagi ........................ | F17C 5/06 141/4 |
| 2012/0267002 A1* | 10/2012 | Kittilsen ................... | F17C 5/06 141/4 |

(Continued)

FOREIGN PATENT DOCUMENTS

| | | | |
|---|---|---|---|
| JP | 2011122657 A | * | 6/2011 |
| JP | 4863651 B2 | | 1/2012 |
| JP | 5804751 B2 | | 11/2015 |

*Primary Examiner* — Timothy L Maust
*Assistant Examiner* — James R Hakomaki
(74) *Attorney, Agent, or Firm* — Carrier Blackman & Associates, P.C.; Joseph P Carrier; Jeffrey T. Gedeon (57) ABSTRACT

If an abnormality detecting unit detects an output abnormality of an internal temperature sensor, a discharge control unit obtains the amount of discharge (a limit value L of gas flow rate F) on the basis of an ambient temperature measured by an ambient temperature sensor, and controls the discharge of fuel gas on the basis of the obtained amount of discharge.

8 Claims, 8 Drawing Sheets

(56) References Cited

U.S. PATENT DOCUMENTS

| | | | |
|---|---|---|---|
| 2013/0014854 A1* | 1/2013 | Mori | B67D 7/348 |
| | | | 141/1 |
| 2014/0376587 A1* | 12/2014 | Sakashita | G01R 31/006 |
| | | | 374/1 |
| 2015/0184804 A1* | 7/2015 | Handa | F17C 13/026 |
| | | | 141/1 |
| 2015/0362383 A1* | 12/2015 | Komiya | G01K 15/005 |
| | | | 702/99 |
| 2016/0305611 A1* | 10/2016 | Handa | F17C 13/023 |
| 2017/0237094 A1* | 8/2017 | Ojima | H01M 8/04067 |
| | | | 429/434 |
| 2018/0048144 A1* | 2/2018 | Nakamura | G01K 7/24 |
| 2018/0156675 A1* | 6/2018 | Kumahara | G01K 15/007 |
| 2018/0183078 A1* | 6/2018 | Yamada | H01M 8/04768 |
| 2019/0301319 A1* | 10/2019 | Uyama | G01K 15/007 |
| 2021/0126228 A1* | 4/2021 | You | H01L 51/5209 |
| 2021/0143458 A1* | 5/2021 | Fujita | H01M 8/04686 |

* cited by examiner

| | | INTERNAL PRESSURE P | | | | | |
|---|---|---|---|---|---|---|---|
| | | FIRST PRESSURE RANGE | SECOND PRESSURE RANGE | THIRD PRESSURE RANGE | FOURTH PRESSURE RANGE | FIFTH PRESSURE RANGE | SIXTH PRESSURE RANGE |
| AMBIENT TEMPERATURE Ta | FIRST TEMPERATURE RANGE | Lx | L1 | L1 | L1 | L2 | L2 |
| | SECOND TEMPERATURE RANGE | L1 | L1 | L1 | L2 | L2 | L2 |
| | THIRD TEMPERATURE RANGE | L1 | L1 | L2 | L2 | L2 | L3 |
| | FOURTH TEMPERATURE RANGE | L1 | L2 | L2 | L2 | L3 | L3 |

(FIRST PRESSURE RANGE<SECOND PRESSURE RANGE<THIRD PRESSURE RANGE<
FOURTH PRESSURE RANGE<FIFTH PRESSURE RANGE<SIXTH PRESSURE RANGE)
(FOURTH TEMPERATURE RANGE<THIRD TEMPERATURE RANGE<SECOND TEMPERATURE RANGE<FIRST TEMPERATURE RANGE)
(L3<L2<L1<Lx)

GAS CONTROL DEVICE AND GAS CONTROL METHOD

CROSS-REFERENCE TO RELATED APPLICATION

This application is based upon and claims the benefit of priority from Japanese Patent Application No. 2019-227862 filed on Dec. 18, 2019, the contents of which are incorporated herein by reference.

BACKGROUND OF THE INVENTION

Field of the Invention

The present invention relates to a gas control device and a gas control method for controlling the discharge of a fuel gas from a high-pressure tank to fuel cells.

Description of the Related Art

Fuel cell vehicles (simply referred to also as vehicles) power drive motors with electricity supplied from storage batteries and fuel cell stacks. Fuel cell stacks generate electric power through electrochemical reactions between hydrogen supplied from a high-pressure tank and oxygen from the air. The amount of power generation by a fuel cell stack is determined by the amount of hydrogen supply. Accordingly, a gas control device controls the amount of discharge of hydrogen gas from the high-pressure tank according to the amount of power generation that is required for the vehicle.

When hydrogen gas is discharged from a high-pressure tank, the pressure inside the high-pressure tank decreases and then the temperature of the hydrogen gas decreases (adiabatic expansion). As the temperature decrease of the hydrogen gas lowers the temperature of the high-pressure tank, the temperature of the high-pressure tank and components around the tank may possibly fall below the lower limits of their usable temperatures (guaranteed temperatures). The components will deteriorate below the lower-limit temperatures.

Japanese Patent No. 4863651 discloses a device that sets a limit value of the output (the amount of power generation) of a fuel cell stack, or a limit value of the amount of discharge (the amount of consumption) of the hydrogen gas, based on the temperature of the hydrogen gas discharged from a high-pressure tank, and limits the output or the amount of discharge below the limit value. The device of Japanese Patent No. 4863651 is capable of preventing deterioration of the hydrogen seal function that would occur due to temperature decrease.

In the device of Japanese Patent No. 4863651, if the temperature sensor that measures the temperature of the hydrogen gas malfunctions, then the limit value cannot be set properly. A method from a fail-safe perspective is proposed as a countermeasure against this problem, in which, when the sensor malfunctions, the limit value is set so that the temperature of the hydrogen gas will not reach the limit of use even without monitoring of the temperature.

SUMMARY OF THE INVENTION

However, addressing this problem from such a fail-safe perspective may lead to setting of unnecessarily low limit values. Then, the limit value may be set at a level where normal running is difficult, for example in the case of a gas control device mounted in a fuel cell vehicle. In this way, setting the limit values from the fail-safe perspective may lessen convenience.

The present invention has been devised considering such a problem, and an object of the invention is to provide a gas control device and a gas control method that prevent deterioration of convenience that would occur due to a fault of a sensor that measures the internal temperature of a high-pressure tank.

According to a first aspect of the present invention, a gas control device includes:
a high-pressure tank configured to store a fuel gas used in a fuel cell;
an internal temperature sensor configured to measure an internal temperature of the high-pressure tank;
a discharge control unit configured to obtain an amount of discharge of the fuel gas to be discharged from the high-pressure tank to the fuel cell, based on the internal temperature measured by the internal temperature sensor, and to perform a discharge control of the fuel gas based on the amount of discharge;
an abnormality detecting unit configured to detect an output abnormality of the internal temperature sensor; and
an ambient temperature sensor configured to measure an ambient temperature outside of the high-pressure tank,
wherein, if the abnormality detecting unit detects an output abnormality of the internal temperature sensor, the discharge control unit obtains the amount of discharge based on the ambient temperature measured by the ambient temperature sensor and performs the discharge control of the fuel gas based on the obtained amount of discharge.

According to a second aspect of the present invention, a gas control method uses:
a high-pressure tank configured to store a fuel gas used in a fuel cell;
an internal temperature sensor configured to measure an internal temperature of the high-pressure tank;
a discharge control unit configured to obtain an amount of discharge of the fuel gas to be discharged from the high-pressure tank to the fuel cell, based on the internal temperature measured by the internal temperature sensor, and to perform a discharge control of the fuel gas based on the amount of discharge;
an abnormality detecting unit configured to detect an output abnormality of the internal temperature sensor; and
an ambient temperature sensor configured to measure an ambient temperature outside of the high-pressure tank,
the gas control method comprising causing the discharge control unit to obtain the amount of discharge based on the ambient temperature measured by the ambient temperature sensor and perform the discharge control of the fuel gas based on the obtained amount of discharge, if the abnormality detecting unit detects an output abnormality of the internal temperature sensor.

According to the invention, it is possible to prevent deterioration of convenience that would occur due to a fault of the sensor that measures the internal temperature of the high-pressure tank.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The gas control device and the gas control method according to the present invention will be described in detail in connection with preferred embodiments while referring to the accompanying drawings.

1. First Embodiment

[1.1. Vehicle 10]

Figure 1:
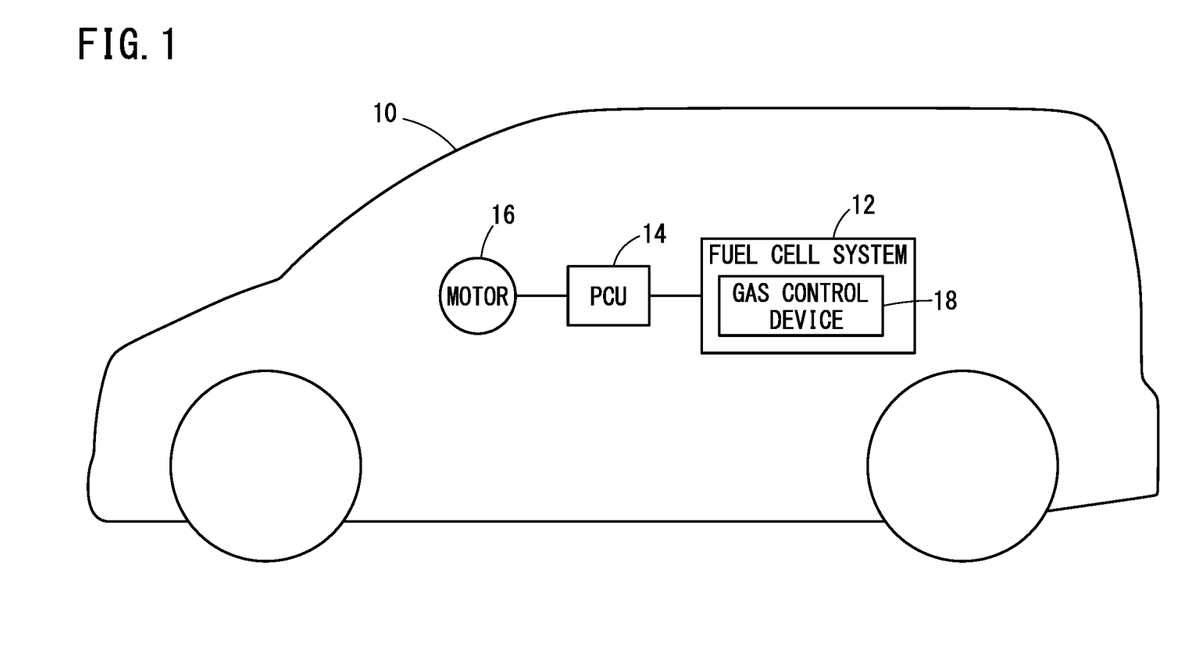
FIG. 1 is a diagram illustrating a fuel cell vehicle.

As shown in FIG. 1, the embodiment described below assumes a gas control device 18 that is provided in a fuel cell system 12 of a vehicle 10. The vehicle 10 is a fuel cell vehicle and includes the fuel cell system 12, a PCU (Power Control Unit) 14, and a drive motor 16 as the load. The fuel cell system 12 includes the gas control device 18 and generates electric power through electrochemical reactions between hydrogen and oxygen. The PCU 14 includes a DC/DC converter and inverter (neither of which is shown). The PCU 14 controls the output from the fuel cell system 12 and outputs it to the motor 16 in response to a command signal from a drive ECU (not shown) configured to control the drive system of the vehicle 10. The motor 16 generates driving power for the vehicle 10.

[1.2. Configuration of Gas Control Device 18]

Figure 2:
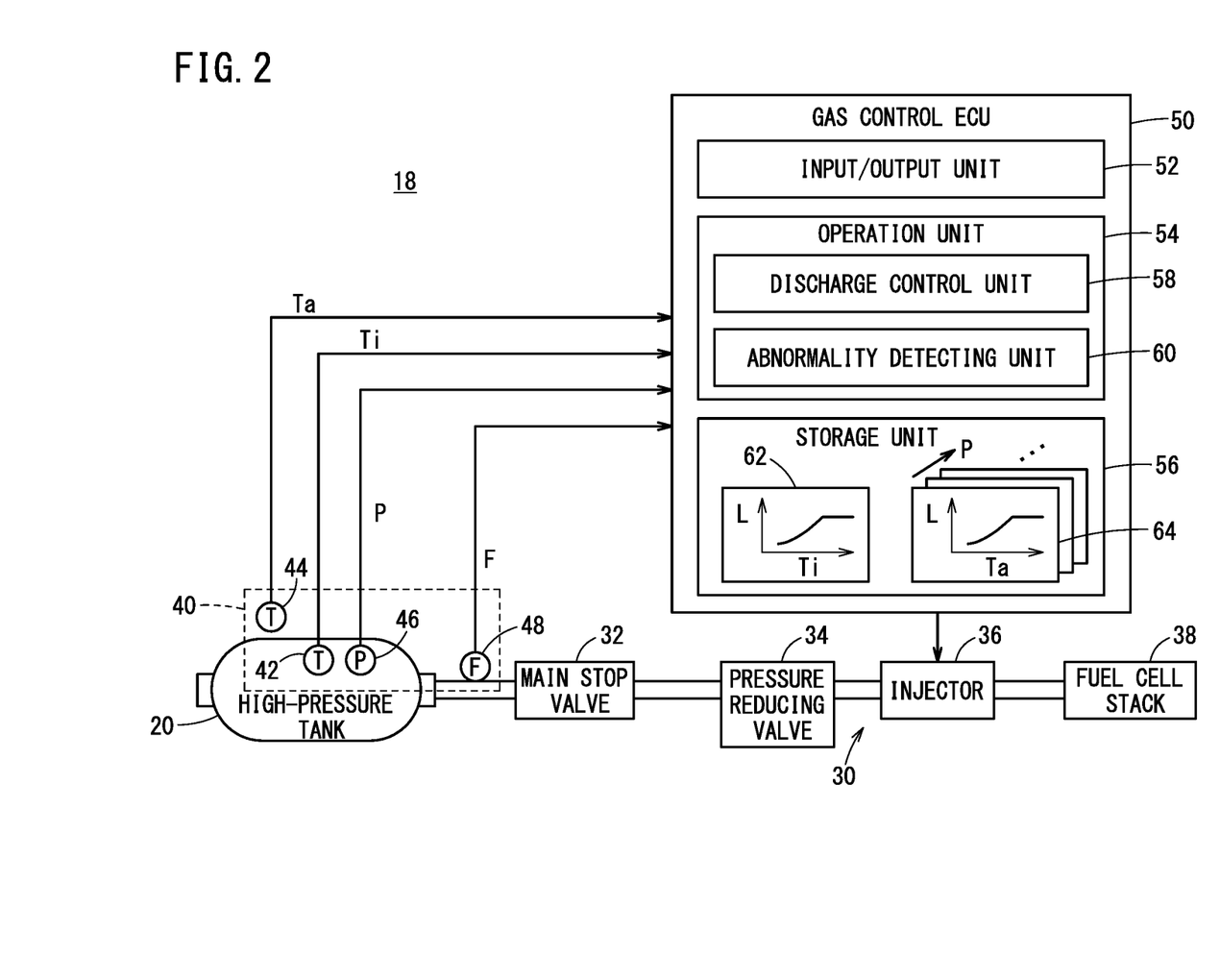
FIG. 2 is a block diagram illustrating a configuration of a gas control device according to a first embodiment.

As shown in FIG. 2, the gas control device 18 includes a high-pressure tank 20, a power plant 30, a sensor group 40, and a gas control ECU 50.

The high-pressure tank 20 includes a liner, reinforcing layer, and cap(s) (not shown). The liner is made of resin, for example, and stores hydrogen gas inside. The reinforcing layer is made of CFRP, for example, and covers the outer peripheral surface of the liner. One or two caps made of metal (aluminum), for example, are provided.

The power plant 30 includes a main stop valve 32, a pressure reducing valve 34, an injector 36, and a fuel cell stack 38. The main stop valve 32 is provided on the piping between the high-pressure tank 20 and the fuel cell stack 38. The main stop valve 32 opens and closes in response to a control signal output from the gas control ECU 50. The pressure reducing valve 34 is provided on the piping between the main stop valve 32 and the fuel cell stack 38. The pressure reducing valve 34 reduces the pressure of the hydrogen gas flowing out from the main stop valve 32. The injector 36 is provided on the piping between the pressure reducing valve 34 and the fuel cell stack 38. The injector 36 controls the amount of discharge (flow rate) of the hydrogen gas into the fuel cell stack 38 in accordance with a control signal output from the gas control ECU 50. The fuel cell stack 38 includes a plurality of power generation cells (not shown). The power generation cells each include an electrode assembly and a pair of separators sandwiching the electrode assembly. The electrode assembly includes an anode electrode, a cathode electrode, and an electrolyte interposed between the two electrodes. In each power generation cell, hydrogen gas is supplied between one separator and the anode electrode, and air (oxygen) is supplied between the other separator and the cathode electrode.

The sensor group 40 includes an internal temperature sensor 42, an ambient temperature sensor 44, a pressure sensor 46, and a flow sensor 48. The internal temperature sensor 42 measures an internal temperature Ti in the high-pressure tank 20. The ambient temperature sensor 44 measures an ambient temperature Ta outside of the high-pressure tank 20. The ambient temperature Ta may be a temperature inside the space where the high-pressure tank 20 is installed, or may be a temperature outside of the vehicle 10 (outside air temperature). The ambient temperature sensor 44 may be attached on the outer peripheral surface of the high-pressure tank 20. The pressure sensor 46 measures an internal pressure P in the high-pressure tank 20. The internal pressure P may be the pressure of the hydrogen gas flowing in the piping from the high-pressure tank 20 to the pressure reducing valve 34. The flow sensor 48 measures the amount of discharge (a gas flow rate F here) of the hydrogen gas discharged from the high-pressure tank 20. The sensors output signals indicating the respective measured values to the gas control ECU 50.

The gas control ECU 50 includes an input/output unit 52, an operation unit 54, and a storage unit 56. The input/output unit 52 is composed of an A/D converter circuit, communication interface, a driver, and others.

The operation unit 54 is composed of a processor having a CPU etc., for example. The operation unit 54 executes programs stored in the storage unit 56 to realize various functions. The operation unit 54 functions as a discharge control unit 58 and an abnormality detecting unit 60.

The discharge control unit 58 controls the discharge of the hydrogen gas in response to a power generation request output from the drive ECU (not shown). The discharge control is classified into a normal control and a flow rate limiting control. The normal control is a discharge control that limits the gas flow rate F at or below a limit value L, with the limit value L of the gas flow rate F being set at a maximum value Lx. As mentioned earlier, the limit value L is the upper limit value of the gas flow rate F that is set in order to prevent deterioration of the high-pressure tank 20 and components thereabround that would occur due to decreased temperatures. The maximum value Lx is a value that is determined by the designs and structures of the high-pressure tank 20 and the power plant 30. That is, the normal control can be said to be a discharge control where limit value L is not set. On the other hand, the flow rate limiting control is a discharge control that limits the gas flow rate F at or below the limit value L, with the limit value L of the gas flow rate F being set below the maximum value Lx. The discharge control unit 58 sets the control value L on the basis of a first map 62 or a second map 64.

The abnormality detecting unit 60 detects output abnormalities of the internal temperature sensor 42. For example, if the abnormality detecting unit 60 does not receive a signal indicating the internal temperature Ti from the internal temperature sensor 42, then the abnormality detecting unit 60 determines that an output abnormality is occurring. Or, the abnormality detecting unit 60 determines that an output abnormality is occurring if the internal temperature Ti measured by the internal temperature sensor 42 is abnormal in comparison with the ambient temperature Ta.

The storage unit 56 is composed of RAM, ROM, hard disk, etc. The storage unit 56 stores various information that is used in operations of the operation unit 54, as well as various programs. The storage unit 56 further stores control information (referred to as first map 62) in which the internal temperature Ti and the limit value L of the gas flow rate F are associated with each other. The storage unit 56 further stores information (referred to as second map 64) in which the ambient temperature Ta, the internal pressure P, and the limit value L of the gas flow rate F are associated with each other. The first map 62 and the second map 64 are previously obtained by actual measurements or simulations.

Figure 3A:
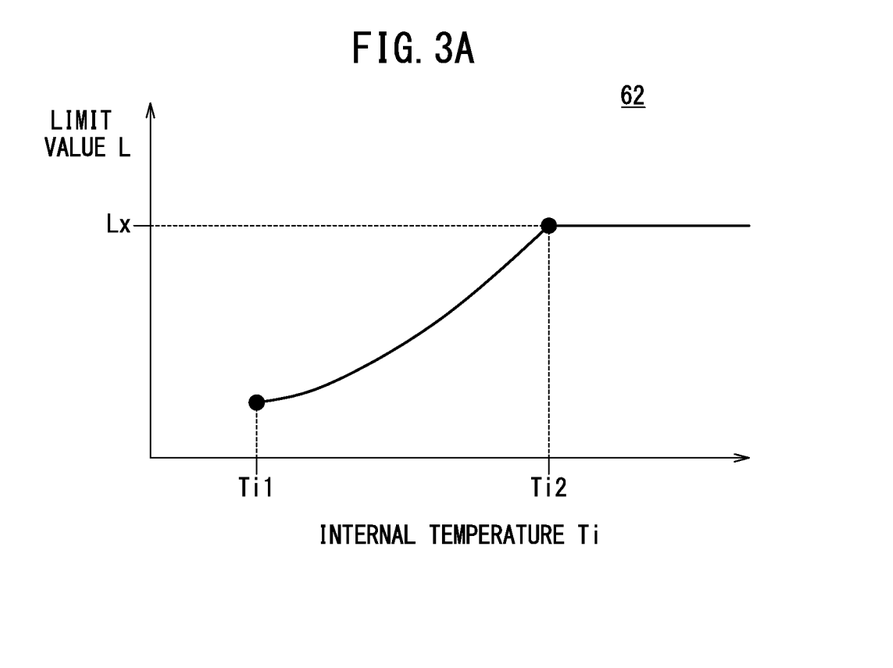
FIG. 3A is a diagram showing an example of a first map.

FIG. 3A shows an example of the first map 62. The first map 62 associates values of the internal temperature Ti in a range from a lowest temperature Ti1 to a temperature value less than a limitation starting value Ti2 (Ti1≤Ti<Ti2), with limit values L that are less than the maximum value Lx. In this temperature range, a lower internal temperature Ti is associated with a smaller limit value L. The lowest temperature Ti1 is the lower limit of temperature at which the vehicle 10 can be used. Further, the first map 62 also associates values of the internal temperature Ti in a temperature range at or above the limitation starting temperature Ti2 (Ti2≤Ti), with the maximum value Lx.

Figure 3B:
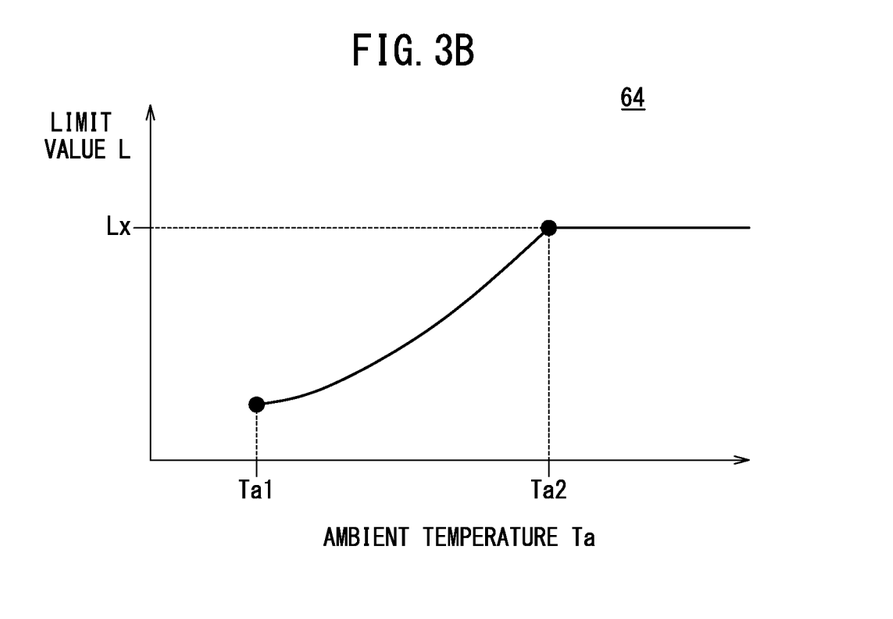
FIG. 3B is a diagram showing an example of a second map.

FIG. 3B shows an example of the second map 64. The second map 64 is information that associates values of the ambient temperature Ta and the limit values L in the cases where a balance is attained between the amount of heat received by the high-pressure tank 20 from the outside atmosphere and the amount of heat discharged by the high-pressure tank 20 to the outside atmosphere as the high-pressure tank 20 discharges the hydrogen gas. The second map 64 is set for each value of the internal pressure P.

The second map 64 associates values of the ambient temperature Ta in a range from a lowest temperature Ta1 to a temperature value less than a limitation starting temperature Ta2 (Ta1≤Ta<Ta2), with limit values L that are less than the maximum value Lx. In this temperature range, a lower ambient temperature Ta is associated with a smaller limit value L. The lowest temperature Ta1 is the lower limit of temperature at which the vehicle 10 can be used. The second map 64 also associates values of the ambient temperature Ta in a temperature range at or above the limitation starting temperature Ta2 (Ta2≤Ta), with the maximum value Lx.

[1.3. Gas Control Method]

A gas control method according to the first embodiment will be described referring to FIG. 4. The process explained below is executed at certain time intervals in the vehicle 10 in which the fuel cell system 12 is operating.

At step S1, the discharge control unit 58 acquires the internal temperature Ti measured by the internal temperature sensor 42, the ambient temperature Ta measured by the ambient temperature sensor 44, and the internal pressure P measured by the pressure sensor 46. After step S1 has ended, the process moves to step S2.

At step S2, the abnormality detecting unit 60 determines whether the internal temperature sensor 42 is normal or not. If the internal temperature sensor 42 is normal (step S2: YES), the process moves to step S3. On the other hand, if the internal temperature sensor 42 is not normal (step S2: NO), then the process moves to step S4.

At step S3, the discharge control unit 58 specifies the limit value L on the basis of the internal temperature Ti of the high-pressure tank 20. The discharge control unit 58 specifies the limit value L that corresponds to the internal temperature Ti in the first map 62. After step S3 has ended, the process moves to step S5.

At step S4, the discharge control unit 58 specifies the limit value L on the basis of the ambient temperature Ta and the internal pressure P. The discharge control unit 58 selects the second map 64 that corresponds to the internal pressure P, and specifies, in the selected second map 64, the limit value L that corresponds to the ambient temperature Ta. After step S4 has ended, the process moves to step S5.

At step S5, the discharge control unit 58 performs the discharge control by setting the limit value L specified at step S3 or step S4. The discharge control unit 58 controls the injector 36 so that the gas flow rate F measured by the flow sensor 48 does not exceed the limit value L. If the internal temperature Ti is at or above the limitation starting temperature Ti2, or if the ambient temperature Ta is at or above the limitation starting temperature Tat, then the discharge control unit 58 does not have to set the maximum value Lx as the limit value L. This is because, structurally, the high-pressure tank 20 and the power plant 30 do not cause the gas flow rate F to exceed the maximum value Lx. After step S5 has ended, the process returns to step S1.

[1.4. Modifications]

The first embodiment can be modified as follows.

[First Modification]

Figure 5:
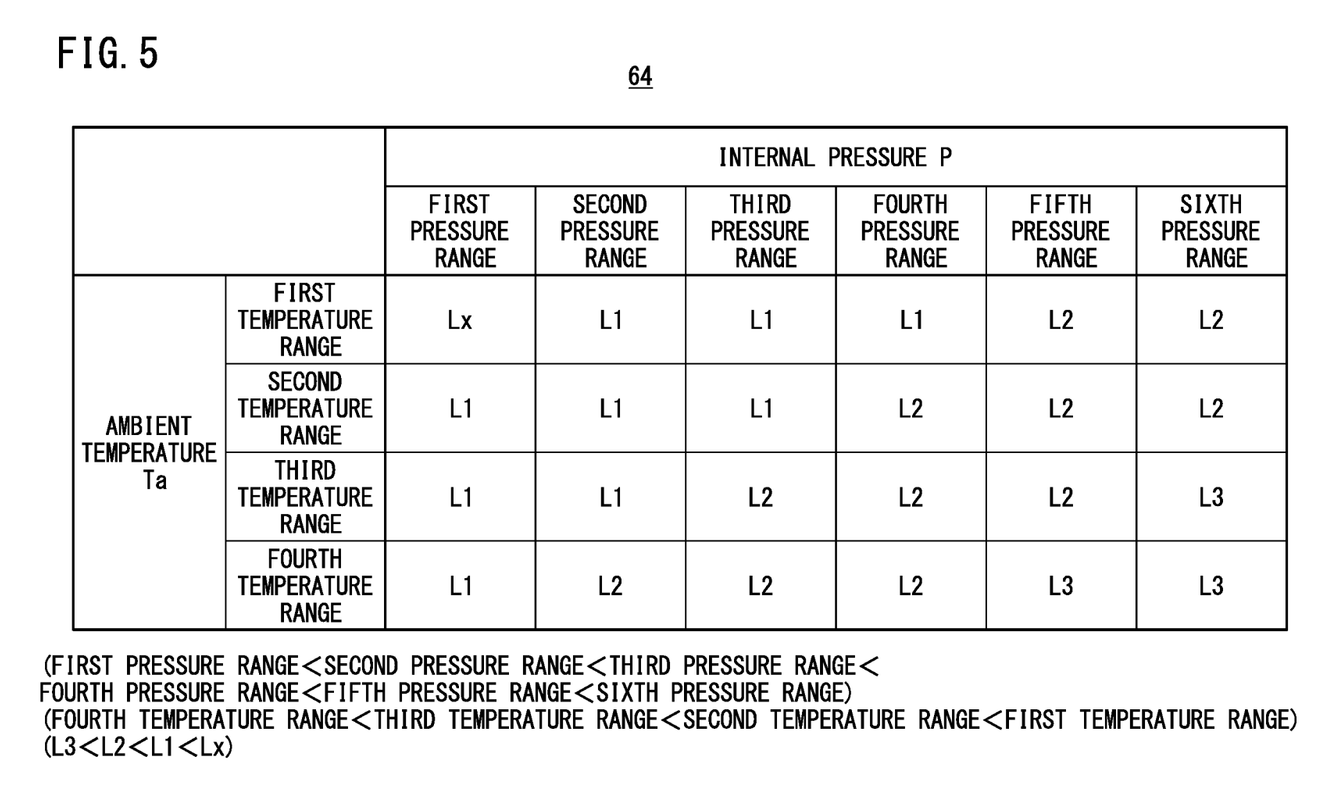
FIG. 5 is a diagram illustrating a second map that is different from that of FIG. 3B.

In place of the second map 64 as shown in FIG. 3B, the second map 64 shown in FIG. 5 may be used. The second map 64 of FIG. 5 is control information in which a plurality of levels of the control value L, a plurality of ranges of the internal pressure P, and a plurality of ranges of the ambient temperature Ta are associated with each other. This second map 64 associates six pressure ranges (first to sixth pressure ranges), four temperature ranges (first to fourth temperature ranges), and four limit values L (Lx, L1 to L3).

The pressure ranges are defined by dividing the range from the upper limit to the lower limit of the internal pressure P of the high-pressure tank 20 into six ranges. The pressures in the ranges become larger in the order of first pressure range, second pressure range, third pressure range, fourth pressure range, fifth pressure range, and sixth pressure range. The temperature ranges are defined by dividing the range of the ambient temperature Ta from the lowest temperature Ta1 to a given temperature into four ranges. The temperatures in the ranges become larger in the order of fourth temperature range, third temperature range, second temperature range, and first temperature range. When using the second map 64 shown in FIG. 5, the discharge control unit 58 can change the control value L among the four levels (Lx, L1, L2, L3).

Figure 4:
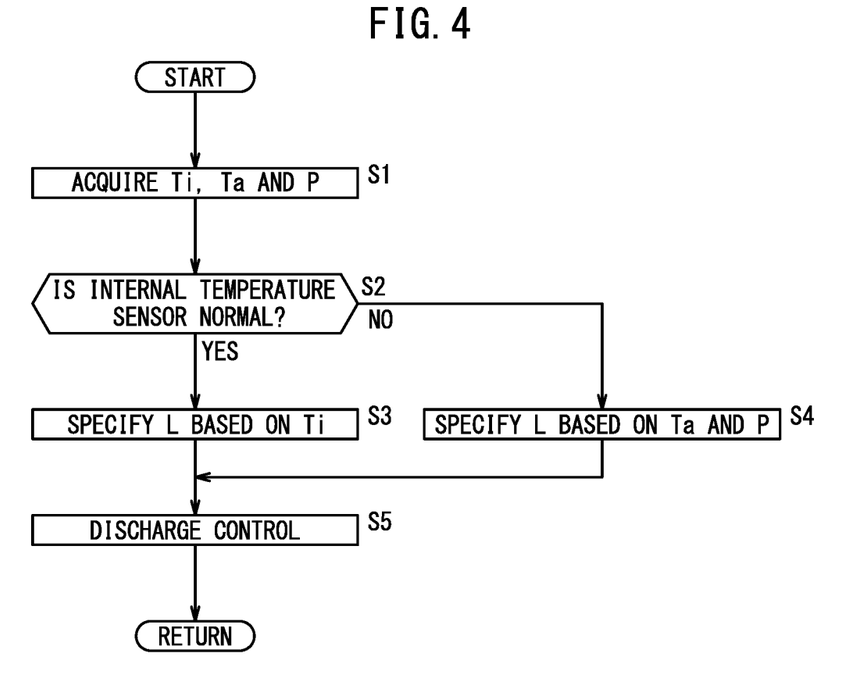
FIG. 4 is a diagram illustrating a process flow that is performed by the gas control device of the first embodiment.

In the first modification, at step S4 shown in FIG. 4, the discharge control unit 58 specifies the temperature range in which the ambient temperature Ta is included and the pressure range in which the internal pressure P is included, by using the second map 64 shown in FIG. 5, and specifies the limit value L that corresponds to these ranges.

[Second Modification]

In the embodiment described above, if an output abnormality occurs in the internal temperature sensor 42, the discharge control unit 58 obtains the limit value L of the gas flow rate F on the basis of the ambient temperature Ta and the internal pressure P. This embodiment may be modified so that the discharge control unit 58 does not use the information of internal pressure P. That is, the discharge control unit 58 obtains the limit value L of the gas flow rate F on the basis of the ambient temperature Ta, when an output abnormality occurs in the internal temperature sensor 42. Then, the discharge control unit 58 may perform the hydrogen gas discharge control based on the obtained limit value L of the gas flow rate F.

Figure 6:
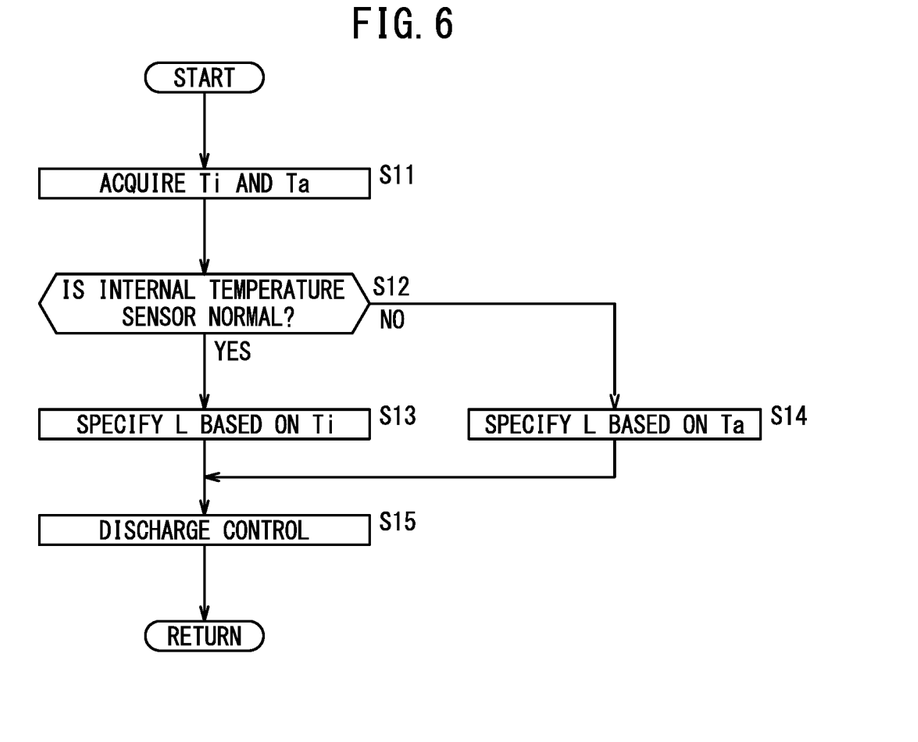
FIG. 6 is a diagram illustrating a process flow that is performed by a gas control device of a second modification.

As shown in FIG. 6, the operations at steps S11 to S15 performed in the second modification are the same as those at steps S1 to S5 of the first embodiment except that the internal pressure P is not used.
[Other Modifications]

The above-described embodiments obtain the limit value L of the gas flow rate F. Incidentally, the gas flow rate F and the amount of power generation of the fuel cell stack 38 are in proportion to each other. Accordingly, the discharge control unit 58 may obtain a limit value of the amount of power generation of the fuel cell stack 38, instead of the limit value L of the gas flow rate F.

The gas control device 18 may be provided in the fuel cell system 12 other than one provided in the vehicle 10. For example, the gas control device 18 may be used for a household fuel cell system 12.

2. Second Embodiment

The fuel cell system 12 may be provided with a plurality of high-pressure tanks 20. An embodiment will be described below in which the gas control device 18 is provided with two high-pressure tanks 20 and 120 having different hydrogen gas storage capacities.

[2.1. Configuration of Gas Control Device 18]

Figure 7:
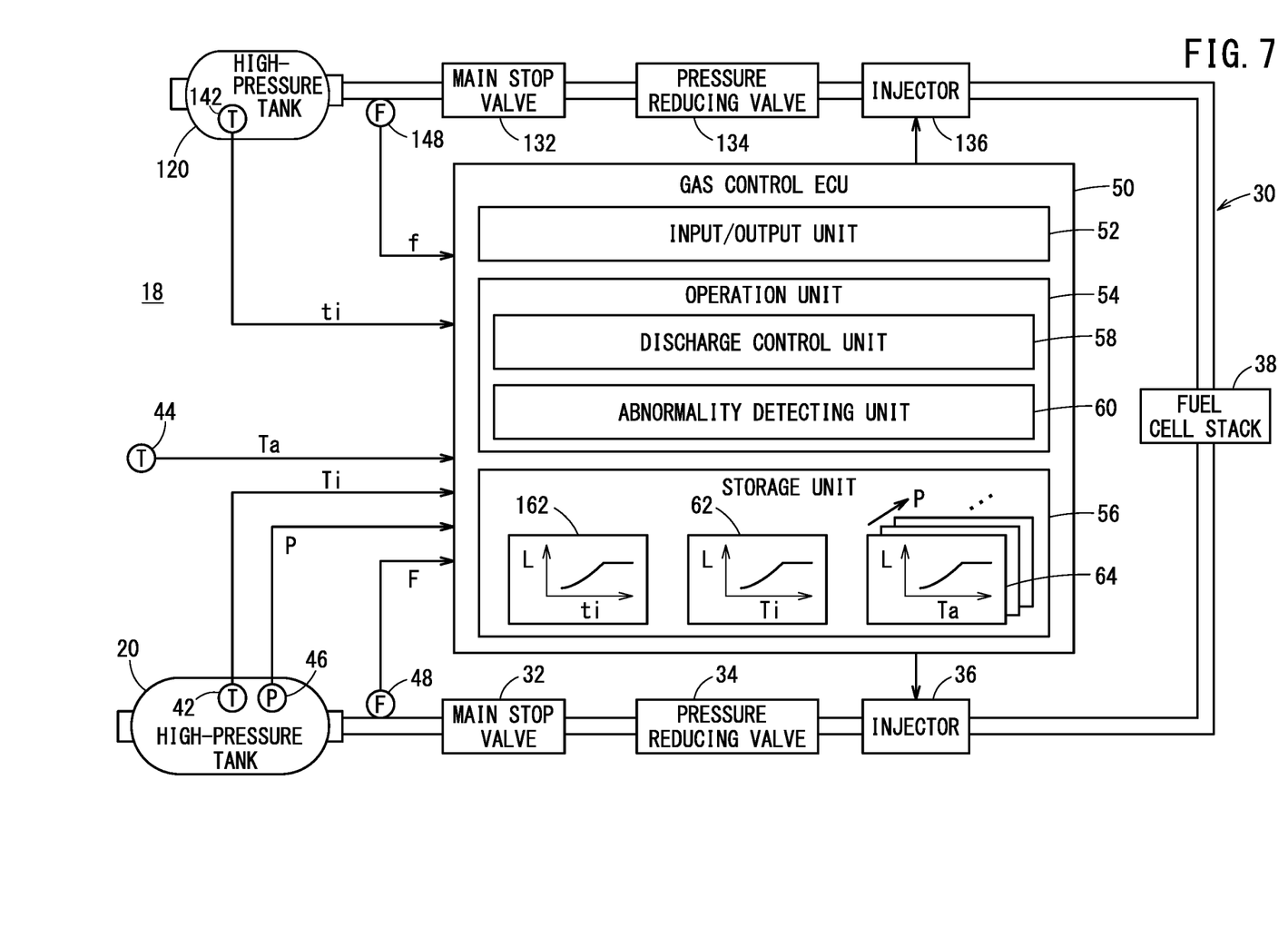
FIG. 7 is a block diagram illustrating a configuration of a gas control device according to a second embodiment.

As shown in FIG. 7, the gas control device 18 of the second embodiment includes a high-pressure tank 120, a main stop valve 132, a pressure reducing valve 134, an injector 136, an internal temperature sensor 142, and a flow sensor 148, in addition to the components of the first embodiment shown in FIG. 1.

The high-pressure tank 120 has a smaller storage capacity than the high-pressure tank 20. The main stop valve 132, the pressure reducing valve 134, and the injector 136 are disposed between the high-pressure tank 120 and the fuel cell stack 38. The internal temperature sensor 142 measures an internal temperature ti of the high-pressure tank 120. The flow sensor 148 measures the amount of discharge (a gas flow rate f here) of the hydrogen gas from the high-pressure tank 120.

The storage unit 56 stores a third map 162 corresponding to the high-pressure tank 120, like the first map 62 corresponding to the high-pressure tank 20. The third map 162 associates values of the internal temperature ti in a range from a lowest temperature ti1 to a temperature value less than a limitation starting value ti2 (ti1≤ti<ti2), with limit values L that are less than the maximum value Lx. The third map 162 also associates values of the internal temperature ti in a temperature range at or above the limitation starting temperature ti2 (ti2≤ti), with the maximum value Lx.

[2.2. Gas Control Method]

In the second embodiment, the discharge control unit 58 performs control operations as follows. If an output abnormality does not occur in the internal temperature sensor 42 and the internal temperature sensor 142, the discharge control unit 58 performs the discharge control by selecting a lower one of the limit value L of the gas flow rate F obtained based on the internal temperature Ti and the limit value L of the gas flow rate f obtained based on the internal temperature ti. If an output abnormality occurs only in the internal temperature sensor 42, the discharge control unit 58 performs the discharge control by selecting a lower one of the limit value L of the gas flow rate F obtained based on the ambient temperature Ta and the limit value L of the gas flow rate f obtained based on the internal temperature ti.

Figure 8:
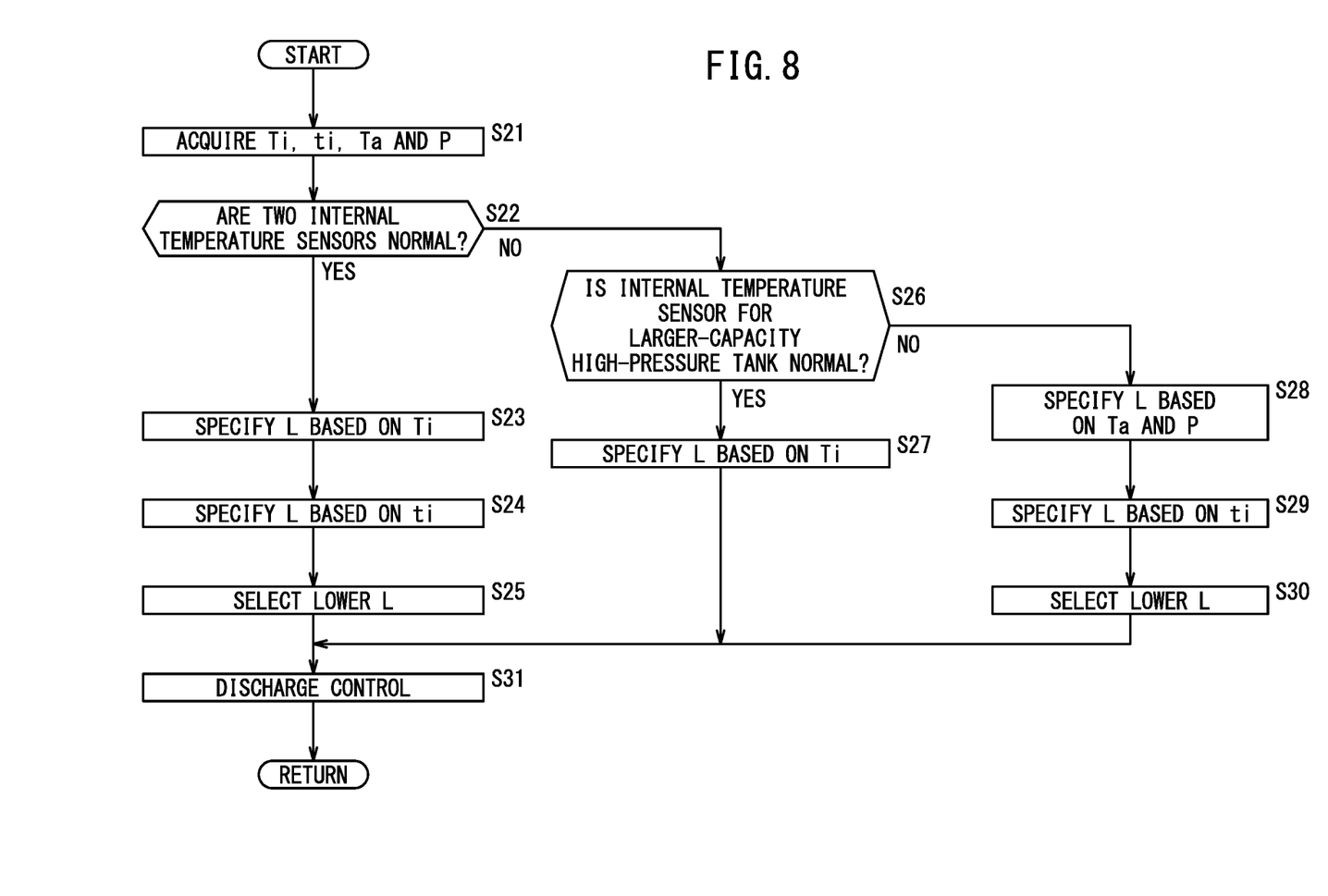
FIG. 8 is a diagram illustrating a process flow that is performed by the gas control device of the second embodiment.

The gas control method of the second embodiment will be described referring to FIG. 8. The operations below are executed at given time intervals in the vehicle 10 in which the fuel cell system 12 is operating.

At step S21, the discharge control unit 58 acquires the internal temperature Ti measured by the internal temperature sensor 42, the internal temperature ti measured by the internal temperature sensor 142, the ambient temperature Ta measured by the ambient temperature sensor 44, and the internal pressure P measured by the pressure sensor 46. After step S21 has ended, the process moves to step S22.

At step S22, the abnormality detecting unit 60 determines whether the internal temperature sensors 42 and 142 are normal or not. If the internal temperature sensors 42 and 142 are normal (step S22: YES), the process moves to step S23. On the other hand, if at least one of the internal temperature sensors is not normal (step S22: NO), then the process moves to step S26.

At step S23, the discharge control unit 58 specifies the limit value L on the basis of the internal temperature Ti of the high-pressure tank 20. The discharge control unit 58 specifies the limit value L that corresponds to the internal temperature Ti in the first map 62. After step S23 has ended, the process moves to step S24.

At step S24, the discharge control unit 58 specifies the limit value L on the basis of the internal temperature ti of the high-pressure tank 120. The discharge control unit 58 specifies the limit value L that corresponds to the internal temperature ti in the third map 162. After step S24 has ended, the process moves to step S25.

At step S25, the discharge control unit 58 compares the two limit values L specified at steps S23 and S24 and selects a lower one of the limit values L. After step S25 has ended, the process moves to step S31.

At step S26, the abnormality detecting unit 60 determines whether the internal temperature sensor (the internal temperature sensor 42 for the high-pressure tank 20 having a larger capacity) is normal or not. If the internal temperature sensor 42 is normal, in other words, if the internal temperature sensor 142 is not normal (step S26: YES), the process moves to step S27. On the other hand, if the internal temperature sensor 42 is not normal, in other words, if the internal temperature sensor 142 is normal (step S26: NO), then the process moves to step S28.

At step S27, the discharge control unit 58 specifies the limit value L on the basis of the internal temperature Ti of the high-pressure tank 20. The discharge control unit 58 specifies the limit value L that corresponds to the internal temperature Ti in the first map 62. After step S27 has ended, the process moves to step S31.

At step S28, the discharge control unit 58 specifies the limit value L on the basis of the ambient temperature Ta and the internal pressure P. The discharge control unit 58 selects the second map 64 that corresponds to the internal pressure P, and specifies the limit value L that corresponds to the ambient temperature Ta in the selected second map 64. After step S28 has ended, the process moves to step S29.

At step S29, as at step S24, the discharge control unit 58 specifies the limit value L on the basis of the internal temperature ti of the high-pressure tank 120. After step S29 has ended, the process moves to step S30.

At step S30, the discharge control unit 58 compares the two limit values L that have been specified at steps S28 and S29, and selects a lower one of the limit values L. After step S30 has ended, the process moves to step S31.

At step S31, the discharge control unit 58 performs the discharge control by setting the limit value L specified at step S25 or step S27 or step S30. The discharge control unit 58 controls the injector 36 so that the gas flow rate F measured by the flow sensor 48 does not exceed the limit value L. Further, the discharge control unit 58 controls the injector 136 so that the gas flow rate f measured by the flow sensor 148 does not exceed the limit value L. After step S31 has ended, the process returns to step S21.

[2.3. Modifications]

The same modifications as those of the first embodiment can be made to the second embodiment.

[3. Technical Ideas Obtained from Embodiments]

Technical ideas that can be obtained from the above-described embodiments and modifications will be recited below.

According to a first aspect of the invention, a gas control device 18 includes:

a high-pressure tank 20 configured to store a fuel gas used in fuel cells (fuel cell stack 38);

an internal temperature sensor 42 configured to measure an internal temperature Ti of the high-pressure tank 20;

a discharge control unit 58 configured to obtain the amount of discharge (the limit value L of the gas flow rate F) of the fuel gas to be discharged from the high-pressure tank 20 to the fuel cells, based on the internal temperature Ti measured by the internal temperature sensor 42, and to perform a discharge control of the fuel gas on the basis of the amount of discharge;

an abnormality detecting unit 60 configured to detect an output abnormality of the internal temperature sensor 42; and an ambient temperature sensor 44 configured to measure an ambient temperature Ta outside of the high-pressure tank 20.

Then, if the abnormality detecting unit 60 detects an output abnormality of the internal temperature sensor 42, the discharge control unit 58 obtains the amount of discharge on the basis of the ambient temperature Ta measured by the ambient temperature sensor 44 and performs the discharge control of the fuel gas on the basis of the obtained amount of discharge.

According to the configuration above, the discharge control is performed on the basis of the ambient temperature Ta measured by the ambient temperature sensor 44 if the internal temperature sensor 42 malfunctions. The internal temperature Ti of the high-pressure tank 20 is influenced by the ambient temperature Ta. Accordingly, the discharge control based on the ambient temperature Ta reflects to some extent the discharge control based on the internal temperature Ti. For example, when the configuration is used for the vehicle 10, the vehicle 10 can run normally. Thus, the configuration above prevents lowering of convenience due to a fault of the internal temperature sensor 42 that measures the internal temperature Ti of the high-pressure tank 20.

In the first aspect, the gas control device 18 may further include a storage unit 56 storing control information (the second map 64 in FIG. 3B) that associates together the ambient temperature Ta and the amount of discharge (the limit value L of the gas flow rate F) in cases where the amount of heat received by the high-pressure tank 20 from the outside atmosphere and the amount of heat discharged by the high-pressure tank 20 to the outside atmosphere as the high-pressure tank 20 discharges the fuel gas are balanced.

Then, if the abnormality detecting unit 60 detects an output abnormality of the internal temperature sensor 42, the discharge control unit 58 may obtain the amount of discharge on the basis of the ambient temperature Ta measured by the ambient temperature sensor 44 and the control information stored in the storage unit 56, and perform the discharge control of the fuel gas on the basis of the obtained amount of discharge.

In the first aspect, the gas control device 18 may further include a pressure sensor 46 configured to measure an internal pressure P of the high-pressure tank 20.

Then, if the abnormality detecting unit 60 detects an output abnormality of the internal temperature sensor 42, the discharge control unit 58 may obtain the amount of discharge (the limit value L of the gas flow rate F) on the basis of the ambient temperature Ta measured by the ambient temperature sensor 44 and the internal pressure P measured by the pressure sensor 46, and perform the discharge control of the fuel gas on the basis of the amount of discharge.

According to the configuration above, if the internal temperature sensor 42 malfunctions, the discharge control is performed on the basis of the ambient temperature Ta measured by the ambient temperature sensor 44 and the internal pressure P measured by the pressure sensor 46. Using not only the ambient temperature Ta but also the internal pressure P enables acquisition of a more accurate amount of discharge (the limit value L of the gas flow rate F).

In the first aspect, the gas control device 18 may further include a storage unit 56 storing, for each value of the internal pressure P, control information (the second map 64 in FIG. 3B) that associates together the ambient temperature Ta and the amount of discharge (the limit value L of the gas flow rate F) in cases where the amount of heat received by the high-pressure tank 20 from the outside atmosphere and the amount of heat discharged by the high-pressure tank 20 to the outside atmosphere as the high-pressure tank 20 discharges the fuel gas are balanced.

Then, if the abnormality detecting unit 60 detects an output abnormality of the internal temperature sensor 42, the discharge control unit 58 may obtain the amount of discharge on the basis of the ambient temperature Ta measured by the ambient temperature sensor 44, the internal pressure P measured by the pressure sensor 46, and the control information stored in the storage unit 56, and perform the discharge control of the fuel gas on the basis of the obtained amount of discharge.

In the first aspect, the gas control device 18 may further include a storage unit 56 storing control information (the second map 64 in FIG. 5) that associates together a plurality of levels of the amount of discharge (Lx, L1, L2, L3), a plurality of ranges of the internal pressure P (the first to sixth pressure ranges), and a plurality of ranges of the ambient temperature Ta (the first to fourth temperature ranges).

Then, if the abnormality detecting unit 60 detects an output abnormality of the internal temperature sensor 42, the discharge control unit 58 may obtain the amount of discharge (the limit value L of the flow rate F) on the basis of the ambient temperature Ta measured by the ambient temperature sensor 44, the internal pressure P measured by the pressure sensor 46, and the control information stored in the storage unit 56, and perform the discharge control of the fuel gas on the basis of the obtained amount of discharge.

In the first aspect, the high-pressure tank may include a first tank (high-pressure tank 20), and a second tank (high-pressure tank 120) that has a smaller storage capacity of the fuel gas than the first tank, and the internal temperature sensor may include a first internal temperature sensor (internal temperature sensor 42) configured to measure the internal temperature Ti of the first tank, and a second internal temperature sensor (internal temperature sensor 142) configured to measure the internal temperature ti of the second tank.

Then, if the abnormality detecting unit 60 does not detect an output abnormality of either of the first internal temperature sensor and the second internal temperature sensor, the discharge control unit 58 may perform the discharge control by selecting a lower one of the amount of discharge (the limit value L of the gas flow rate F) obtained based on the internal temperature Ti measured by the first internal temperature sensor and the amount of discharge (the limit value L of the gas flow rate f) obtained based on the internal temperature ti measured by the second internal temperature sensor, and if the abnormality detecting unit 60 detects an output abnormality of only the first internal temperature sensor, the discharge control unit 58 may perform the discharge control by selecting a lower one of the amount of discharge obtained based on the ambient temperature Ta measured by the ambient temperature sensor 44 and the amount of discharge obtained based on the internal temperature ti measured by the second internal temperature sensor.

According to a second aspect of the invention, a gas control method uses:

a high-pressure tank 20 configured to store a fuel gas used in fuel cells (fuel cell stack 38);

an internal temperature sensor 42 configured to measure an internal temperature Ti of the high-pressure tank 20;

a discharge control unit 58 configured to obtain an amount of discharge (the limit value L of the gas flow rate F) of the fuel gas to be discharged from the high-pressure tank 20 to the fuel cells, based on the internal temperature Ti measured by the internal temperature sensor 42, and to perform a discharge control of the fuel gas on the basis of the amount of discharge;

an abnormality detecting unit 60 configured to detect an output abnormality of the internal temperature sensor 42; and an ambient temperature sensor 44 configured to measure an ambient temperature Ta outside of the high-pressure tank 20.

Then, if the abnormality detecting unit 60 detects an output abnormality of the internal temperature sensor 42, the discharge control unit 58 obtains the amount of discharge on the basis of the ambient temperature Ta measured by the ambient temperature sensor 44 and performs the discharge control of the fuel gas on the basis of the obtained amount of discharge.

In the second aspect, the gas control method may further use a pressure sensor 46 configured to measure an internal pressure P of the high-pressure tank 20.

Then, if the abnormality detecting unit 60 detects an output abnormality of the internal temperature sensor 42, the discharge control unit 58 may obtain the amount of discharge (the limit value L of the gas flow rate F) on the basis of the ambient temperature Ta measured by the ambient temperature sensor 44 and the internal pressure P measured by the pressure sensor 46, and perform the discharge control of the fuel gas on the basis of the amount of discharge.

The second aspect offers the same effects as the first aspect.

The gas control device and the gas control method of the present invention are not limited to the embodiments described above but can of course adopt various configurations without departing from the essence and gist of the invention.

What is claimed is:

1. A gas control device comprising:
    a high-pressure tank configured to store a fuel gas used in a fuel cell;
    an internal temperature sensor configured to measure an internal temperature of the high-pressure tank;
    a discharge control unit configured to obtain an amount of discharge of the fuel gas to be discharged from the high-pressure tank to the fuel cell, based on the internal temperature measured by the internal temperature sensor, and to perform a discharge control of the fuel gas based on the amount of discharge;
    an abnormality detecting unit configured to detect an output abnormality of the internal temperature sensor; and
    an ambient temperature sensor configured to measure an ambient temperature outside of the high-pressure tank,
    wherein, if the abnormality detecting unit detects an output abnormality of the internal temperature sensor, the discharge control unit switches temperature information from the internal temperature to the ambient temperature for use in obtaining the amount of discharge, obtains the amount of discharge based on the ambient temperature measured by the ambient temperature sensor and performs the discharge control of the fuel gas based on the obtained amount of discharge.

2. The gas control device according to claim 1, further comprising a storage unit configured to store control information that associates together the ambient temperature and the amount of discharge in a case where an amount of heat received by the high-pressure tank from an outside atmosphere and an amount of heat discharged by the high-pressure tank to the outside atmosphere as the high-pressure tank discharges the fuel gas are balanced,
    wherein, if the abnormality detecting unit detects an output abnormality of the internal temperature sensor, the discharge control unit obtains the amount of discharge based on the ambient temperature measured by the ambient temperature sensor and the control information stored in the storage unit, and performs the discharge control of the fuel gas based on the obtained amount of discharge.

3. The gas control device according to claim 1, further comprising a pressure sensor configured to measure an internal pressure of the high-pressure tank,
    wherein, if the abnormality detecting unit detects an output abnormality of the internal temperature sensor, the discharge control unit obtains the amount of discharge based on the ambient temperature measured by the ambient temperature sensor and the internal pressure measured by the pressure sensor, and performs the discharge control of the fuel gas based on the obtained amount of discharge.

4. The gas control device according to claim 3, further comprising a storage unit configured to store, for each value of the internal pressure, control information that associates together the ambient temperature and the amount of discharge in a case where an amount of heat received by the high-pressure tank from an outside atmosphere and an amount of heat discharged by the high-pressure tank to the outside atmosphere as the high-pressure tank discharges the fuel gas are balanced,
    wherein, if the abnormality detecting unit detects an output abnormality of the internal temperature sensor, the discharge control unit obtains the amount of discharge based on the ambient temperature measured by the ambient temperature sensor, the internal pressure measured by the pressure sensor, and the control information stored in the storage unit, and performs the discharge control of the fuel gas based on the obtained amount of discharge.

5. The gas control device according to claim 3, further comprising a storage unit configured to store control information that associates together a plurality of levels of the amount of discharge, a plurality of ranges of the internal pressure, and a plurality of ranges of the ambient temperature, wherein, if the abnormality detecting unit detects an output abnormality of the internal temperature sensor, the discharge control unit obtains the amount of discharge based on the ambient temperature measured by the ambient temperature sensor, the internal pressure measured by the pressure sensor, and the control information stored in the storage unit, and performs the discharge control of the fuel gas based on the obtained amount of discharge.

6. The gas control device according to claim 1, wherein the high-pressure tank comprises a first tank, and a second tank that has a smaller storage capacity of the fuel gas than the first tank, the internal temperature sensor comprises a first internal temperature sensor configured to measure the internal temperature of the first tank, and a second internal temperature sensor configured to measure the internal temperature of the second tank, and if the abnormality detecting unit does not detect an output abnormality of either of the first internal temperature sensor and the second internal temperature sensor, the discharge control unit performs the discharge control by selecting a lower one of the amount of discharge obtained based on the internal temperature measured by the first internal temperature sensor and the amount of discharge obtained based on the internal temperature measured by the second internal temperature sensor, and if the abnormality detecting unit detects an output abnormality of only the first internal temperature sensor, the discharge control unit performs the discharge control by selecting a lower one of the amount of discharge obtained based on the ambient temperature measured by the ambient temperature sensor and the amount of discharge obtained based on the internal temperature measured by the second internal temperature sensor.

7. A gas control method which uses:

a high-pressure tank configured to store a fuel gas used in a fuel cell;

an internal temperature sensor configured to measure an internal temperature of the high-pressure tank;

a discharge control unit configured to obtain an amount of discharge of the fuel gas to be discharged from the high-pressure tank to the fuel cell, based on the internal temperature measured by the internal temperature sensor, and to perform a discharge control of the fuel gas based on the amount of discharge;

an abnormality detecting unit configured to detect an output abnormality of the internal temperature sensor; and an ambient temperature sensor configured to measure an ambient temperature outside of the high-pressure tank, the gas control method comprising causing the discharge control unit to switch temperature information from the internal temperature to the ambient temperature for use in obtaining the amount of discharge, obtain the amount of discharge based on the ambient temperature measured by the ambient temperature sensor and perform the discharge control of the fuel gas based on the obtained amount of discharge, subsequent to the abnormality detecting unit detecting an output abnormality of the internal temperature sensor.

8. The gas control method according to claim 7, which further uses a pressure sensor configured to measure an internal pressure of the high-pressure tank, wherein, subsequent to the abnormality detecting unit detecting the output abnormality of the internal temperature sensor, the discharge control unit obtains the amount of discharge based on the ambient temperature measured by the ambient temperature sensor and the internal pressure measured by the pressure sensor, and performs the discharge control of the fuel gas based on the obtained amount of discharge.

* * * * *